(12) United States Patent
Mehta

(10) Patent No.: US 11,080,406 B2
(45) Date of Patent: Aug. 3, 2021

(54) DETECTION OF VULNERABLE CODE

(71) Applicant: Cylance Inc., Irvine, CA (US)

(72) Inventor: Paul Mehta, Irvine, CA (US)

(73) Assignee: Cylance Inc., Irvine, CA (US)

( * ) Notice: Subject to any disclaimer, the term of this patent is extended or adjusted under 35 U.S.C. 154(b) by 270 days.

(21) Appl. No.: 15/829,646

(22) Filed: Dec. 1, 2017

(65) Prior Publication Data

US 2018/0157845 A1 Jun. 7, 2018

Related U.S. Application Data

(60) Provisional application No. 62/430,296, filed on Dec. 5, 2016.

(51) Int. Cl.
*G06F 21/57* (2013.01)
*G06F 21/56* (2013.01)

(52) U.S. Cl.
CPC .......... *G06F 21/577* (2013.01); *G06F 21/563* (2013.01); *G06F 2221/033* (2013.01)

(58) Field of Classification Search
CPC . G06F 21/577; G06F 21/563; G06F 2221/033
See application file for complete search history.

(56) References Cited

U.S. PATENT DOCUMENTS

| | | | | |
|---|---|---|---|---|
| 9,208,323 | B1* | 12/2015 | Karta | G06F 21/577 |
| 9,798,884 | B1* | 10/2017 | Bishop, III | G06N 20/00 |
| 9,892,253 | B1* | 2/2018 | Mehr | G06F 21/52 |
| 9,921,942 | B1* | 3/2018 | Makohon | G06F 11/3672 |
| 2013/0198565 | A1* | 8/2013 | Mancoridis | G06F 11/008 714/26 |
| 2018/0018459 | A1* | 1/2018 | Zhang | G06F 21/554 |
| 2018/0103054 | A1* | 4/2018 | Cran | H04L 63/1433 |

* cited by examiner

*Primary Examiner* — Trang T Doan
*Assistant Examiner* — Jessica J South
(74) *Attorney, Agent, or Firm* — Jones Day

(57) ABSTRACT

A machine learning model is applied to at least determine whether a computer program includes vulnerable code. The machine learning model is trained to determine whether the computer program includes vulnerable code based at least on a presence and/or absence of a first trait. An indication can be provided, via a user interface, an indication that the computer program includes vulnerable code, when the computer program is determined to include vulnerable code. Related methods and articles of manufacture, including computer program products, are also provided.

20 Claims, 3 Drawing Sheets

DETECTION OF VULNERABLE CODE

RELATED APPLICATION

The current application claims priority to U.S. Pat. App. Ser. No. 62/430,296 filed on Dec. 5, 2016, the contents of which are hereby fully incorporated by reference.

TECHNICAL FIELD

The subject matter described herein relates generally to code analysis and more specifically to techniques for detecting vulnerable code.

BACKGROUND

Even a carefully developed computer program can harbor vulnerable code that can be exploited by malicious actors to introduce unwanted and/or unintended behavior in the computer program. One common example of vulnerable code may be a computer program that is susceptible to buffer overflows. Here, the computer program may operate on a fixed sized block of memory space or buffer. However, the computer program may be written in a programming language (e.g., C, C++) that does not perform bound checking. As such, the computer program may respond to overflow data that exceeds the capacity of the buffer by overwriting and corrupting adjacent memory spaced used by another computer program. In some instances, a buffer overflow may be orchestrated to introduce malicious program code as overflow data into the adjacent memory space.

SUMMARY

Systems, methods, and articles of manufacture, including computer program products, are provided for detecting vulnerable code. In some implementations of the current subject matter, there is provided a system that includes at least one processor and at least one memory at least one memory including program code which when executed by the at least one memory provides operations. The operations may include: applying a machine learning model to at least determine whether a computer program includes vulnerable code, the machine learning model being trained to determine whether the computer program includes vulnerable code based at least on a presence and/or absence of a first trait; and providing an indication that the computer program includes vulnerable code, when the computer program is determined to include vulnerable code. The providing can include one or more of: causing the indication to be displayed in a user interface, transmitting the indication to a remote computing system, loading the indication into memory, or storing the indication in physical persistence.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
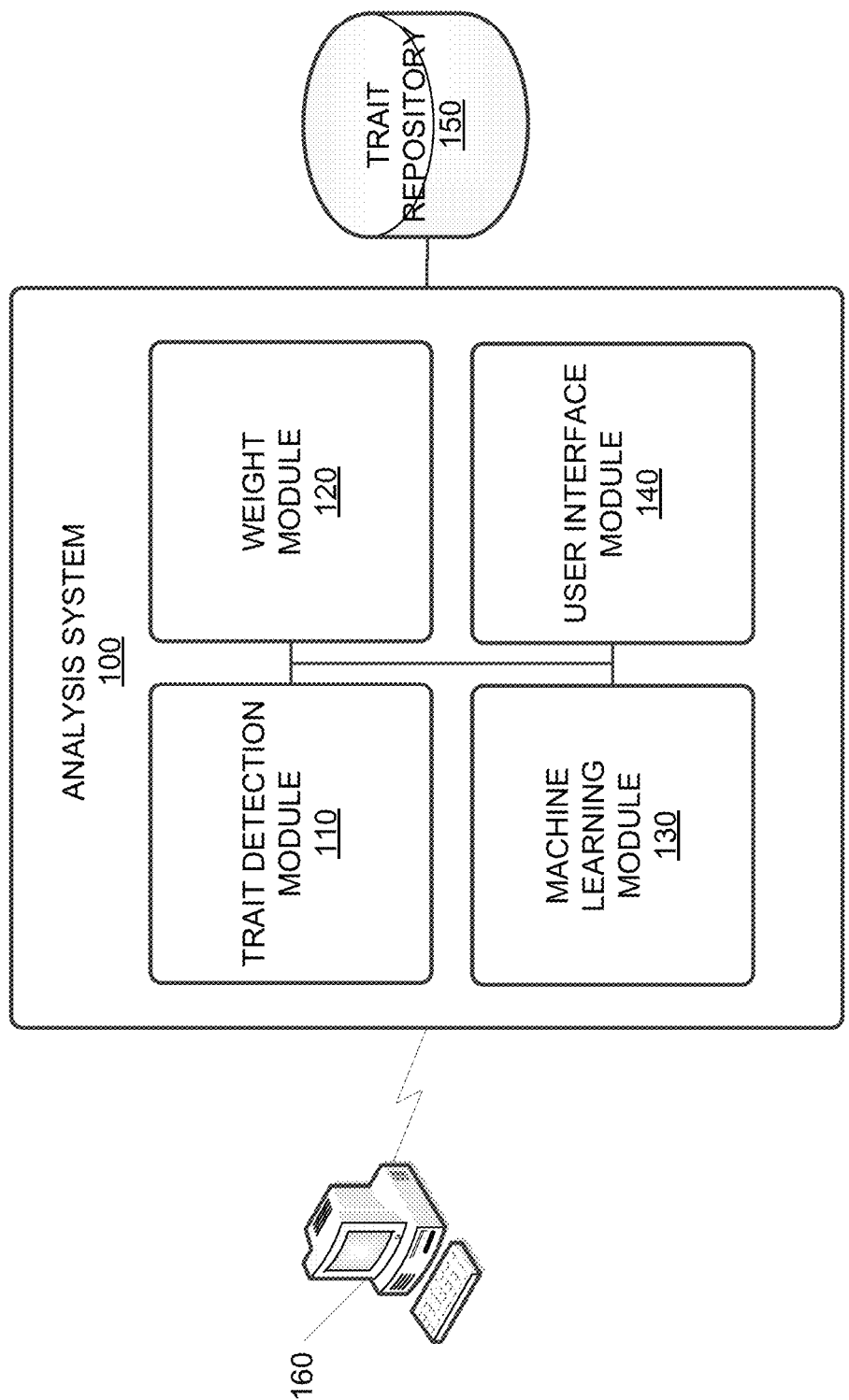
FIG. 1 depicts a block diagram illustrating an analysis system consistent with implementations of the current subject matter.

Like labels are used to refer to same or similar items in the drawings.

DETAILED DESCRIPTION

Despite the threat associated with vulnerable code, conventional solutions are generally limited to manual inspection and analysis of a computer program for the presence of vulnerable code. But manually inspecting and analyzing a computer program for vulnerable code tend to be time consuming and ineffective. For instance, buffer overflows may be difficult to detect by manually cross referencing the source and destination addresses of various function calls (e.g., memcpy( )) moving data from one memory location to another memory location.

In some implementations of the current subject matter, an analysis system can be configured to identify one or more traits exhibited by a computer program. Alternately and/or additionally, the analysis system can identify one or more traits that are absent from the computer program. For instance, the analysis system can be configured to perform static code analysis to identify traits including, for example, memory usage (e.g., dynamic or static sized buffers), signed operations, indexed memory reads and writes, application programming interface (API) usage, and code complexity. The analysis system can further assign different weights to each of the one or more traits present in and/or absent from the computer program. According to some implementations of the current subject matter, the one or more traits can be indicative of vulnerabilities to exploits including, for example, structured query language (SQL) injection, operating system (OS) command injection, cross-site scripting, cross-site request forgery, open redirection, buffer overflow, and path traversal. It should be appreciated that the analysis system can be configured to identify traits indicative of any type of vulnerable code without departing from the scope of the present disclosure. For instance, vulnerable code can correspond to software bugs such as errors, faults, flaws, failures, and/or the like in a computer program.

In some implementations of the current subject matter, the analysis system can be configured to detect, based on the presence and/or absence of one or more traits as well as the corresponding weights, whether a computer program includes vulnerable code. For example, the analysis system can determine, based on the presence and/or absence of one or more traits as well as the corresponding weights, a likelihood that the computer program includes vulnerable code. The likelihood that the computer program includes vulnerable code may correspond to a measure of the security risk associated with the computer program.

Alternately and/or additionally, in some implementations of the current subject matter, the analysis system can identify one or more traits exhibited by a computer program that is known to include vulnerable code. The analysis system can further determine, based on the presence and/or absence of the same one or more traits in another computer program, whether that computer program includes a same and/or similar vulnerable code.

In some implementations of the current subject matter, the analysis system can determine that a computer program require further development and/or analysis, when the computer program is determined to include vulnerable code. For instance, if the likelihood that the computer program includes vulnerable code exceeds a threshold value, the analysis system can determine that the computer program requires further development and/or analysis. Alternately and/or additionally, the analysis system can determine that a computer program requires further development and/or analysis if the computer program includes at least some of the same traits that are present in another computer program that is known to include vulnerable code.

According to some implementations of the current subject matter, a computer program that is determined to include vulnerable code may be subject to further analysis that includes, for example, dynamic code analysis wherein the computer program may be executed to evaluate its runtime behavior. As such, the analysis system can be configured to collect runtime information during the execution of a computer program determined to include vulnerable code. Runtime information can be used to further enhance the inspection and analysis of the computer program including, for example, identification of the exact type and/or location of the vulnerability exhibited by the computer program.

In some implementations of the current subject matter, the analysis system can be configured to apply a machine learning models to determine whether a computer program includes vulnerable code. For example, the machine learning model can be a random forest that includes one or more decision trees. A computer program may exhibit a plurality of traits including, for example, memory usage (e.g., dynamic or static sized buffers), signed operations, indexed memory reads and writes, API usage, and code complexity. Alternately and/or additionally, one or more traits may be absent from the computer program. According to some implementations of the current subject matter, the analysis system can generate and train one or more decision trees based on training data that includes one or more computer programs known to include or not include vulnerabilities. Generating a decision tree can include recursively splitting the subset of training data that is associated with each node of the decision tree until all subsets of training data are pure subsets, which are subsets of the training data associated with one type of classification (e.g., the presence or the absence of vulnerable code in a computer program).

As one example, the root node of a decision tree may correspond to the trait for memory usage. The decision tree may be subsequently split to include one child node that corresponds one subset of computer programs having dynamic sized buffers and another child node that corresponds to another subset of computer programs having static sized buffers. Here, the analysis system can determine, based on the training data, whether any of the subsets of training data associated with these child nodes require further splitting. For example, the subset of training data with dynamic sized buffers may require additional splitting (e.g., into two or more additional subsets), when the subset of training data with dynamic sized buffers is not pure. That is, the subset of training data with dynamic sized buffers is not pure if some computer programs with dynamic sized buffers include vulnerabilities while other computer programs with dynamic sized buffers do not include vulnerabilities. By contrast, the subset of training data with static sized buffers may not require additional splitting, when the subset of training data having static sized buffers is pure. For instance, the subset of training data for static sized buffers may not require additional splitting if all computer programs with static sized buffers are known to include vulnerabilities.

In some implementations of the current subject matter, the weight that is associated with each trait may correspond to a purity of the split of a corresponding node in a decision tree. Referring to the child node for dynamic sized buffers. The purity of the split for that child node may correspond to a ratio of a number of computer programs with dynamic sized buffers that do include vulnerabilities and a number of computer programs with dynamic sized buffers that do not include vulnerabilities. Accordingly, the weight that is associated with a trait may be higher when the purity for the split at the node corresponding to the trait is higher. Alternately, the weight that is associated with a trait may be lower when the purity for the split at the node corresponding to the trait is lower.

In some implementations of the currents subject matter, the analysis system can determine, based on one or more decision trees, whether a computer program includes vulnerabilities to exploits including, for example, SQL injection, OS command injection, cross-site scripting, cross-site request forgery, open redirection, buffer overflow, and path traversal. The analysis system can generate and train a separate decision tree for each type of vulnerability. For instance, the analysis system can generate and train one decision tree that is configured to detect a vulnerability for SQL injection and another decision that is configured to detect a vulnerability for OS command injection. The analysis system can apply a plurality of decision trees to a computer program to determine whether the computer program includes a plurality of different types of vulnerabilities. For example, the analysis system can apply a decision tree to a computer program by traversing, based at least on the traits that are present in the computer program, the decision tree from a root node of the decision tree to one of a plurality of leaf nodes in the decision tree. The classification for the computer program (e.g., as including or not including a vulnerability and/or a certain type of vulnerability) may correspond to the classification associated with the leaf node. Moreover, the analysis system can determine a confidence score for the classification of the computer program based at least on the weight or purity associated with that leaf node.

FIG. 1 depicts a block diagram illustrating an analysis system 100, in accordance with some example embodiments. Referring to FIG. 1, the analysis system 100 can include a trait detection module 110, a weight module 120, a machine learning module 130, and a user interface module 140. As shown in FIG. 1, the analysis system 100 can be communicatively coupled to a trait repository 150. Furthermore, the analysis system 100 can communicate with a client device 160. For instance, the analysis system 100 may communicate with the client device 160 via a wired and/or wireless network (e.g., a wide area network (WAN), a local area network (LAN), and/or the Internet). Although the analysis system 100 is shown to as a remote and/or cloud platform, it should be appreciated that the analysis system 100 can also be deployed as computer software and/or dedicated circuitry (e.g., application specific integrated circuits (ASICs)) on the client device 160 without departing from the scope of the present disclosure.

In some implementations of the current subject matter, the trait detection module 110 can be configured to identify one or more traits in a computer program. For example, the trait detection module 110 can identify one or more traits indicative of the presence of vulnerable code in the computer program. The absence and/or presence of certain traits (e.g., memory usage, signed operations, indexed memory reads and writes, API usage, code complexity) can indicate that the computer program includes code that renders the computer program susceptible to exploits such as SQL injection, OS command injection, cross-site scripting, cross-site request forgery, open redirection, buffer overflow, path traversal, and/or the like.

In some implementations of the current subject matter, traits indicative of vulnerable code can be stored in the trait repository 150. The trait detection module 110 can be configured to determine whether one or more traits from the trait repository 150 are present and/or absent from a computer program. Moreover, the trait detection module 110 can be configured to update the trait repository 150 with additional traits that can be indicative of vulnerable code. For example, the trait detection module 110 can identify traits that are associated with known vulnerabilities (e.g., software bugs) and update the trait repository 150 with these traits. By doing so, the trait detection module 110 may subsequently be able to recognize, based on the presence and/or absence of these traits, a same or similar vulnerabilities in various computer programs.

In some implementations of the current subject matter, the weight module 120 can be configured to assign weights to each trait that is determined (e.g., by the trait detection module 11) to be present or absent from a computer program. The presence or absence of some traits may be more dispositive of vulnerable code than the presence or absence of other traits. Thus, the weight module 120 can assign, to a trait, a weight that corresponds to a likelihood that a computer program having or lacking that trait includes vulnerable code. Accordingly, a trait that is more dispositive of vulnerable code can be assigned a relatively higher weight than a trait that is less dispositive of vulnerable code.

In some implementations of the current subject matter, the trait detection module 110 can be configured to determine whether a computer program includes vulnerable code. For instance, the trait detection module 110 may determine, based on the presence and/or absence of one or more traits as well as the corresponding weights, a likelihood that the computer program includes vulnerable code. The likelihood that the computer program includes vulnerable code may be a weighted sum of the one or more traits that are determined to be present in and/or absent from the computer program. According to some implementations of the current subject matter, the trait detection module 110 can determine that the computer program includes vulnerable code when the value of P exceeds a certain threshold. The likelihood P that a computer program may include vulnerable code can be expressed by the following equation (1):

$$P = w_1 + w_2 + \ldots + w_n \qquad (1)$$

wherein the likelihood P can be a sum of the respective weights $w_1, w_2, \ldots w_n$ associated with each of the n number of traits present in and/or absent from the computer program.

The trait detection module 110 can also be configured to determine whether a computer program includes vulnerable code based on the presence and/or absence of traits associated with known vulnerabilities. For instance, the trait detection module 110 can identify an n number of traits $t_1, t_2, \ldots, t_n$ that are associated with a known vulnerability A. That is, the trait detection module 110 can determine that traits $t_1, t_2, \ldots, t_n$ are present in and/or absent from a computer program that is known to include vulnerability A. As such, based on the presence and/or absence of the same traits $t_1, t_2, \ldots, t_n$ in another computer program, the trait detection module 110 can further determine whether that other computer program includes the same vulnerability A and/or a similar vulnerability A'. For example, the trait detection module 110 can determine that the other computer program includes the same vulnerability A and/or a similar vulnerability A' if the same traits $t_1, t_2, \ldots, t_n$ are present and/or absent from that computer program. Alternately and/or additionally, the trait detection module 110 can determine that the other computer program includes the same vulnerability A and/or a similar vulnerability A' if greater than a threshold number of the traits $t_1, t_2, \ldots, t_n$ are present and/or absent from that computer program.

In some implementations of the current subject matter, the machine learning module 130 can be configured to apply one or more machine learning models to identify one or more traits that are indicative of vulnerable code. For example, the machine learning module 130 can be configured to generate and train a random forest that includes a plurality of decision trees. Each decision tree can be generated and trained to detect, in a computer program, the presence of one or more traits indicative of a specific type of vulnerability. For instance, the machine learning module 130 can apply a random forest to a computer program to determine whether the computer program includes vulnerabilities to exploits that include, for example, SQL injection, OS command injection, cross-site scripting, cross-site request forgery, open redirection, buffer overflow, and path traversal. According to some implementations of the current subject matter, each decision tree in the random forest can be configured to detect a specific type of vulnerability. For example, one decision tree can be configured to detect a vulnerability to SQL injection while another decision tree can be configured to detect a vulnerability to OS command injection.

In some implementations of the current subject matter, the machine learning module 130 can generate and train a decision tree based on training data that includes one or more computer programs that are known to include vulnerable code. For example, the machine learning module 130 may select a trait from the plurality of traits present in the training data. Here, the machine learning module 130 may select a trait that maximizes the purity of the resulting subsets of the training data and/or the confidence score that is associated with each of the resulting child nodes. The machine learning module 130 can subsequently split the root node of the decision tree into one or more child nodes that each correspond to a subset of the training data. According to some implementations of the current subject matter, the machine learning module 130 can continue to recursively split each of the nodes in the decision tree until the subsets of the training data that are associated with the leaf nodes of the decision tree are all pure sub sets.

Figure 3:
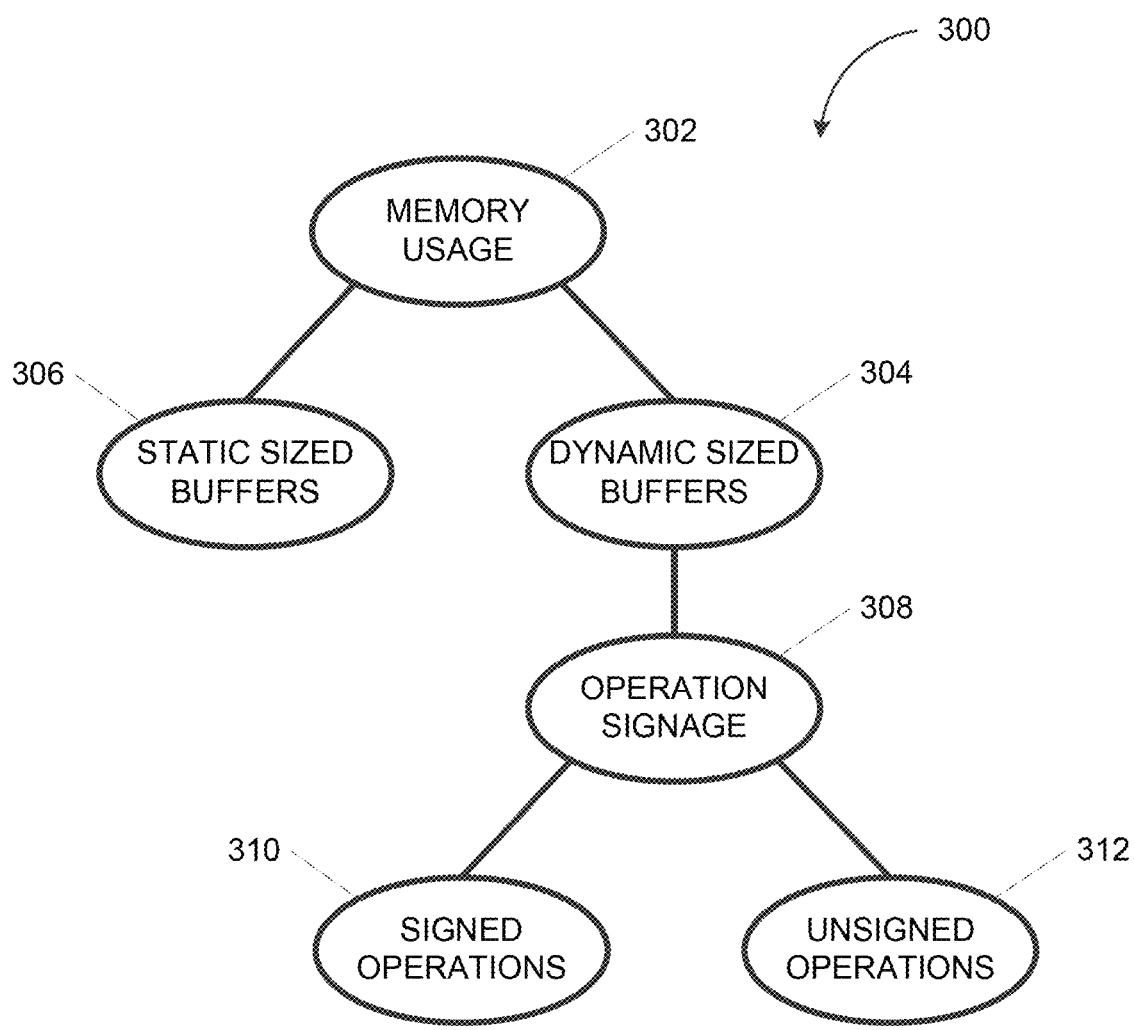
FIG. 3 depicts a decision tree consistent with implementations of the current subject matter.

FIG. 3 depicts a decision tree 300 consistent with implementations of the current subject matter. Referring to FIG. 3, the machine learning module 130 may generate and train the decision tree 300 to determine whether a computer program includes a vulnerability and/or a specific type of vulnerability. As shown in FIG. 3, the machine learning module 130 may select memory usage as the trait associated with a first node 302, which may be the root node of the decision tree 300. The first node 302 can have one or more child nodes including, for example, a second node 304 and a third node 306. The second node 304 can correspond to a subset of training data that includes static sized buffers while the third node 306 can correspond to a different subset of training data that includes dynamic sized buffers. In some implementations of the current subject matter, the generating and training of the decision tree 300 can include determining whether to further split the respective subsets of training data associated with the second node 304 and/or the third node 306.

Referring again to FIG. 3, the machine learning module 130 may determine that the subset of training data associated with the third node 306 does not require further splitting, when that subset of training data is a pure subset. That is, the subset of training data associated with the third node 306 is not split further if every computer program in that subset of training data include a vulnerability and/or a certain type of vulnerability. By contrast, the machine learning module 130 may determine that the subset of training data associated with second node 304 does require further splitting, when that subset of training data is not a pure subset. As shown in FIG. 3, some computer programs in the subset of training data having a dynamic sized buffer can include a vulnerability and/or a certain type of vulnerability. However, other computer programs in the same subset of training data do not include a vulnerability and/or a certain type of vulnerability. Accordingly, the machine learning module 130 can further split the subset of training data that is associated with the second node 304. For instance, the subset of training data having dynamic sized buffers can be further split based on the trait for operation signage, which may be associated with a fourth node 308.

To further illustrate the recursive splitting of subsets of training data, the subset of training data having dynamic sized buffers may be split into one subset of training data having signed operations (e.g., at a fifth node 310) and another subset of training data having unsigned operations (e.g., at a sixth node 312). The machine learning module 130 can again determine whether the subset of training data at each of the fifth node 310 and the sixth node 312 require further splitting. As noted earlier, the machine learning module 130 can further split a subset of training data, when the subset of training data is not a pure subset. By contrast, a subset of training data is not split further, when that subset of training data is a pure subset. For instance, as shown in FIG. 3, the subset of training data associated with the fifth node 310 is not split further if all computer programs having signed operations do not include vulnerabilities or a certain type of vulnerabilities. Similarly, the subset of training data associated with the sixth node 312 is also not split further if all computer programs having unsigned operations do include vulnerabilities or a certain type of vulnerabilities.

In some implementations of the current subject matter, the machine learning module 310 can determine whether a computer program includes one or more vulnerabilities by traversing the decision tree 300. For example, the machine learning module 130 may traverse the decision tree 300 from the root node of the decision tree 300 (e.g., the first node 302) to one of the leaf nodes (e.g., the third node 306, the fifth node 310, or the sixth node 312). The machine learning module 130 can traverse the decision tree based on the traits that are present in the computer program. The classification for the computer program (e.g., as including or not including a vulnerability or a certain type of vulnerability) can correspond to the classification that is associated with the leaf node that is at the end of the path traversed by the machine learning module 130. Referring again to FIG. 3, the machine learning module 130 may classify a computer program having dynamic sized buffers and signed operations. As such, the path that is traversed by the machine learning module 130 when classifying that computer program can include the first node 302, the second node 304, the fourth node 308 and the fifth node 310. Moreover, the classification for the computer program can correspond to the classification associated with the fifth node 310. Thus, the machine learning module 130 can determine that a computer program having dynamic sized buffers and signed operations does not include any vulnerabilities and/or a specific type of vulnerability.

The user interface module 140 can be configured to generate a user interface (e.g., a graphic user interface (GUI)) that provides a corresponding indication of whether the computer program includes vulnerable code. According to some implementations of the current subject matter, the user interface can further display signifiers (e.g., color-coded highlighting and/or the like) that indicate the portions of the computer program determined to include vulnerable code. In other cases, the indication is provided by transmitting it to a remote computing system, loading the indication into memory, and/or by storing the indication in physical persistence.

Figure 2:
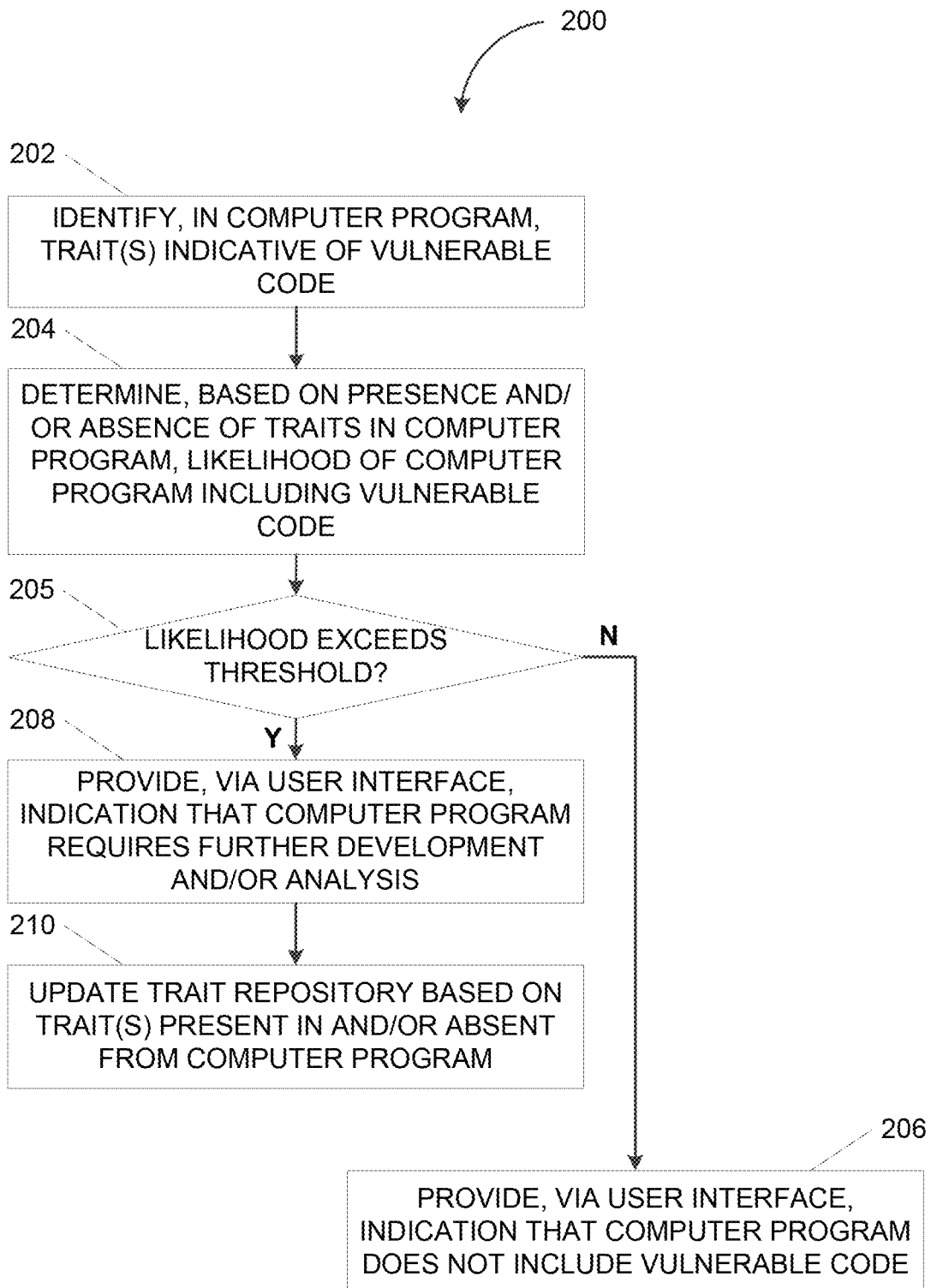
FIG. 2 depicts a flowchart illustrating a process for detecting vulnerable code consistent with implementations of the current subject matter.

FIG. 2 depicts a flowchart illustrating a process 200 for detecting vulnerable code consistent with implementations of the current subject matter. Referring to FIGS. 1-2, the process 200 can be performed by the analysis system 100.

The analysis system 100 can identify, in a computer program, one or more traits indicative of vulnerable code (202). For example, in some implementations of the current subject matter, the analysis system 100 (e.g., the trait detection module 110) can perform static code analysis to identify traits including, for example, memory usage (e.g., dynamic or static sized buffers), signed operations, indexed memory reads and writes, API usage, and code complexity. Such traits may indicate a presence of software bugs and/or a susceptibility to exploits including, for example, SQL injection, OS command injection, cross-site scripting, cross-site request forgery, open redirection, buffer overflow, and path traversal. Alternately and/or additionally, the analysis system 100 can identify traits that are present in and/or absent from a different computer program known to include vulnerable code. The analysis system 100 can then determine, based on the presence and/or absence of the same traits, whether the computer program includes the same and/or similar vulnerable code.

The analysis system 100 can determine, based on the presence and/or absence of one or more traits in the computer program, a likelihood that the computer program includes vulnerable code (204). For example, the analysis system 100 (e.g., the weight module 120) can assign weights to each of the traits that is determined to be present in and/or absent from the computer program. The weight assigned to a trait can correspond to a likelihood that a computer program having or lacking that trait includes vulnerable code. In some implementations of the current subject matter, the likelihood that the computer program includes vulnerable code can be a weighted sum of the one or more traits that are determined to be present in and/or absent from the computer program.

The analysis system 100 can determine that the likelihood that the computer program includes vulnerable code does not exceed a threshold value (205-N). For instance, the weighted sum of the one or more traits present in the computer program may not exceed a threshold value. As such, the analysis system 100 can provide, via a user interface, an indication that the computer program does not include vulnerable code (206). For example, the analysis system 100 (e.g., the user interface module 140) can generate a user interface (e.g., GUI) that provides an indication that the computer program does not include vulnerable code as the weighted sum of the one or more traits present in the computer program does not exceed a threshold value.

Alternately, if the likelihood that the computer program includes vulnerable code exceeds a threshold value (205-Y), the analysis system 100 can provide, via a user interface, an indication that the computer program requires further development and/or analysis (208). For example, when the likelihood that the computer program includes vulnerable code exceeds a threshold value, the analysis system 100 (e.g., the user interface module 140) can generate a user interface (e.g., GUI) that provides an indication that the computer program includes vulnerable code. The user interface can further indicate that the computer program requires further development and/or analysis (e.g., dynamic code analysis). Alternately and/or additionally, the user interface can display signifiers (e.g., color-coded highlighting and/or the like) that indicate the portions of the computer program determined to include vulnerable code.

The analysis system 100 can further update the trait repository 150 based on the one or more traits that are present and/or absent from the computer program (210). For example, the analysis system 100 can update the repository 150 with traits that are present in and/or absent from the computer program. The analysis system 100 can subsequently determine, based at least on these traits, whether another computer program includes the same and/or similar vulnerable code.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one processor; and
   at least one memory including program code which when executed by the at least one processor provides operations comprising:
   applying each of a plurality of different machine learning models to at least determine whether a computer program includes vulnerable code, the plurality of different machine learning models each being trained to determine whether the computer program includes vulnerable code based at least on a presence and/or absence of a corresponding first trait, each of the machine learning models being trained to identify a different program code vulnerability; and
   providing an indication that the computer program includes vulnerable code, when the computer program is determined to include vulnerable code;
   wherein:
   the providing comprises at least one of: causing the indication to be displayed in a user interface, transmitting the indication to a remote computing system, loading the indication into memory, or storing the indication in physical persistence;
   one of the machine learning models comprises a random forest decision tree comprising a plurality of nodes including a first child node that corresponds to one subset of computer programs having dynamic sized buffers, a second child node that corresponds to another subset of computer programs having static sized buffers, a third child node depending from the first child node that determines whether the computer program includes signed operations, a fourth child node that depends from the third child node that corresponds to computer programs having signed operations, and a fifth child node that depends from the third child node that corresponds to computer programs having unsigned operations; and
   the applying comprises traversing nodes of the random forest decision tree based on the presence or absence of the first trait in the computer program to determine whether the computer program includes one or more vulnerabilities.

2. The system of claim 1, wherein the user interface is configured to provide an indication that the computer program requires further development and/or analysis, when the likelihood that the computer program includes vulnerable code exceeds a threshold value.

3. The system of claim 1, wherein the operations further comprise:
   generating and training a first decision tree forming part of the random forest decision tree to at least determine whether the computer program includes vulnerable code and/or a specific type of vulnerable code.

4. The system of claim 3, wherein the first decision tree is trained based at least on training data, and wherein the training data includes one or more computer programs known to include and/or not include vulnerable code and/or the specific type of vulnerable code.

5. The system of claim 4, wherein the generating and training of the first decision tree comprises:
   selecting the first trait to be associated with a root node of the first decision tree, the first trait being associated with a first subset of training data having a first value for the first trait and a second subset of training data having a second value for the first trait, the first subset of training data being associated with a first child node of the root node of the first decision tree, and the second subset of training data being associated with a second child node of the root node of the first decision tree.

6. The system of claim 5, wherein the generating and the training of the first decision tree further comprises:
   splitting the first subset of training data and/or the second subset of training data, when the first subset of training data and/or the second subset of training data includes both computer programs that known to include vulnerable code and/or the specific type of vulnerable code and computer programs known to not include vulnerable code and/or the specific type of vulnerable code.

7. The system of claim 1, wherein the vulnerable code comprises code that is vulnerable to structured query language (SQL) injection, operating system (OS) command injection, cross-site scripting, cross-site request forgery, open redirection, buffer overflow, and/or path traversal.

8. The system of claim 1, wherein the first trait comprises memory usage, signed operations, indexed memory reads and writes, application programming interface (API) usage, and/or code complexity.

9. A computer-implemented method for preventing computer program memory buffer overflow comprising:
   applying a machine learning model to at least determine whether a computer program includes vulnerable code, the machine learning model being trained to determine whether the computer program includes vulnerable code based at least on a presence and/or absence of each of a plurality of different traits relating to memory usage by the computer program, the traits being indicative of computer program memory buffer overflow; and
   providing an indication that the computer program includes vulnerable code, when the computer program is determined to include vulnerable code;
   wherein:
   the providing comprises at least one of: causing the indication to be displayed in a user interface, transmitting the indication to a remote computing system, loading the indication into memory, or storing the indication in physical persistence;

the machine learning model comprises a random forest decision tree comprising a plurality of nodes including a first child node that corresponds to one subset of computer programs having dynamic sized buffers, a second child node that corresponds to another subset of computer programs having static sized buffers, a third child node depending from the first child node that determines whether the computer program includes signed operations, a fourth child node that depends from the third child node that corresponds to computer programs having signed operations, and a fifth child node that depends from the third child node that corresponds to computer programs having unsigned operations; and the applying comprises traversing nodes of the random forest decision tree based on which of the plurality of traits are present or absent in the computer program to determine whether the computer program includes one or more vulnerabilities.

10. The method of claim 9, wherein the user interface is configured to provide an indication that the computer program requires further development and/or analysis, when the likelihood that the computer program includes vulnerable code exceeds a threshold value.

11. The method of claim 9 further comprising:
generating and training a first decision tree forming part of the random forest decision tree to at least determine whether the computer program includes vulnerable code and/or a specific type of vulnerable code.

12. The method of claim 11, wherein the first decision tree is trained based at least on training data, and wherein the training data includes one or more computer programs known to include and/or not include vulnerable code and/or the specific type of vulnerable code.

13. The method of claim 12, wherein the generating and training of the first decision tree comprises:
selecting a first trait to be associated with a root node of the first decision tree, the first trait being associated with a first subset of training data having a first value for the first trait and a second subset of training data having a second value for the first trait, the first subset of training data being associated with a first child node of the root node of the first decision tree, and the second subset of training data being associated with a second child node of the root node of the first decision tree, the first child node corresponding to a subset of computer programs having dynamic sized buffers and the second child node corresponding to another subset of computer programs having static sized buffers.

14. The method of claim 13, wherein the generating and the training of the first decision tree further comprises:
splitting the first subset of training data and/or the second subset of training data, when the first subset of training data and/or the second subset of training data includes both computer programs that known to include vulnerable code and/or the specific type of vulnerable code and computer programs known to not include vulnerable code and/or the specific type of vulnerable code.

15. The method of claim 9, wherein:
the plurality of traits comprises memory usage and indexed memory reads and writes.

16. A non-transitory computer program product storing instructions which, when executed by at least one data processor forming part of at least one computing device, implement operations comprising:
applying a machine learning model to at least determine whether a computer program includes vulnerable code, the machine learning model being trained to determine whether the computer program includes vulnerable code based at least on a presence and/or absence of a first trait; and
providing an indication that the computer program includes vulnerable code, when the computer program is determined to include vulnerable code;
initiating, in response to the provided indication, execution of the computer program; and
collecting runtime information during the execution of the computer program to identify an exact type and/or location of a vulnerability exhibited by the computer program;
wherein:
the machine learning model comprises a random forest decision tree having a root node corresponding to memory usage;
the decision tree comprises a plurality of nodes and is split to include a first child node that corresponds to one subset of computer programs having dynamic sized buffers, a second child node that corresponds to another subset of computer programs having static sized buffers, a third child node that depends from the first node that determines whether the computer program includes signed operations, a fourth child node that depends on the third child node that corresponds to computer programs having signed operations, and a fifth child node that depends on the third child node corresponding to computer programs having unsigned operations; and
the applying comprises traversing nodes of the random forest decision tree based on the presence or absence of the first trait in the computer program to determine whether the computer program includes one or more vulnerabilities.

17. The computer program product of claim 16, wherein the vulnerable code comprises code that is vulnerable to structured query language (SQL) injection, operating system (OS) command injection, cross-site scripting, cross-site request forgery, open redirection, buffer overflow, and/or path traversal.

18. The computer program product of claim 16, wherein the first trait comprises memory usage, signed operations, indexed memory reads and writes, application programming interface (API) usage, and/or code complexity.

19. The computer program product of claim 16, wherein the providing data comprises displaying, in a user interface, data indicating that the computer program requires further development and/or analysis, when the likelihood that the computer program includes vulnerable code exceeds a threshold value.

20. The computer program product of claim 16, wherein the operations further comprising: generating and training the random forest decision tree to at least determine whether the computer program includes a specific type of vulnerable code.

* * * * *